Dec. 15, 1936. G. FOGES 2,064,599
METHOD OF AND APPARATUS FOR GUIDING AIRCRAFT IN LANDING
Filed Feb. 9, 1933 6 Sheets-Sheet 1

Inventor
Georg Foges
by Lorra v Kellenbeck
Attorneys

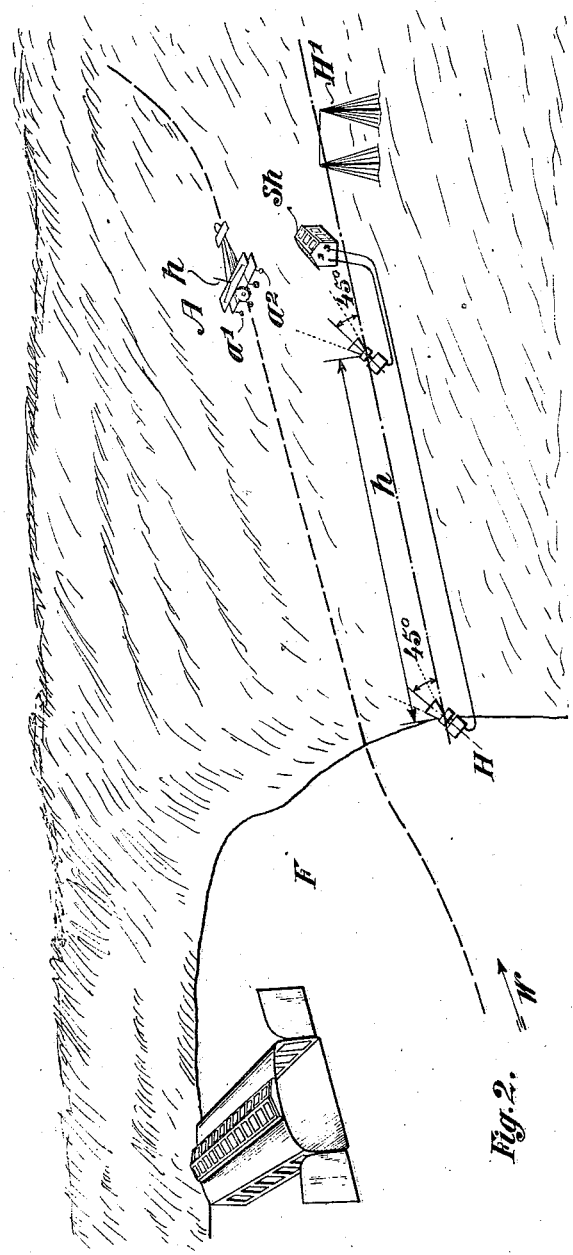

Dec. 15, 1936. G. FOGES 2,064,599
METHOD OF AND APPARATUS FOR GUIDING AIRCRAFT IN LANDING
Filed Feb. 9, 1933 6 Sheets-Sheet 3

Inventor
Georg Foges
by Max Kahlenbeck
Attorneys

Inventor
Georg Foges
by Lotka & Kehlenbeck
Attorneys

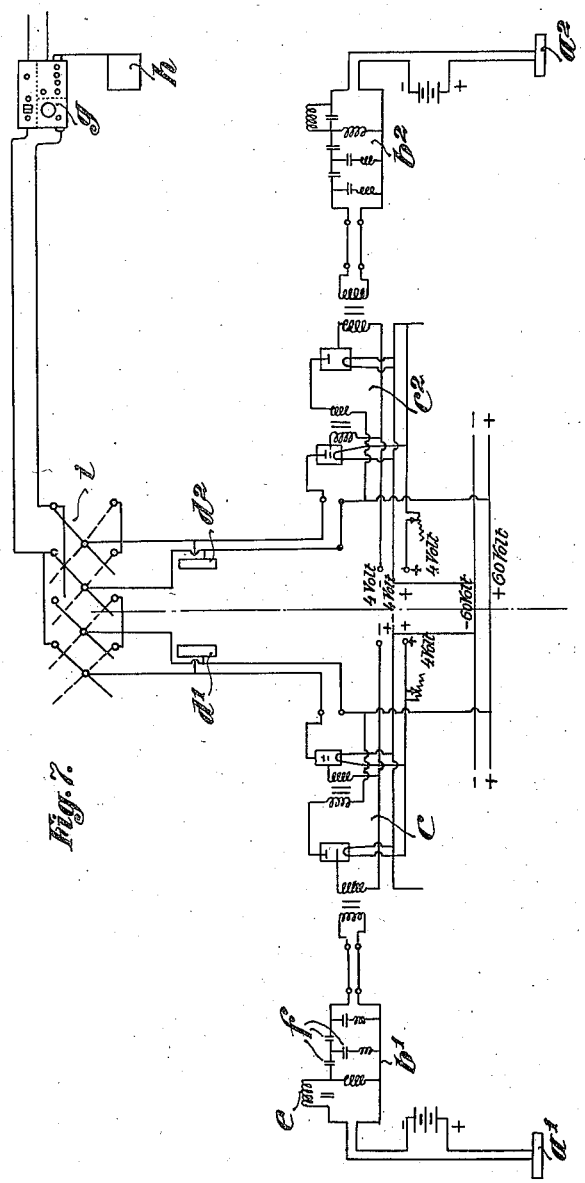

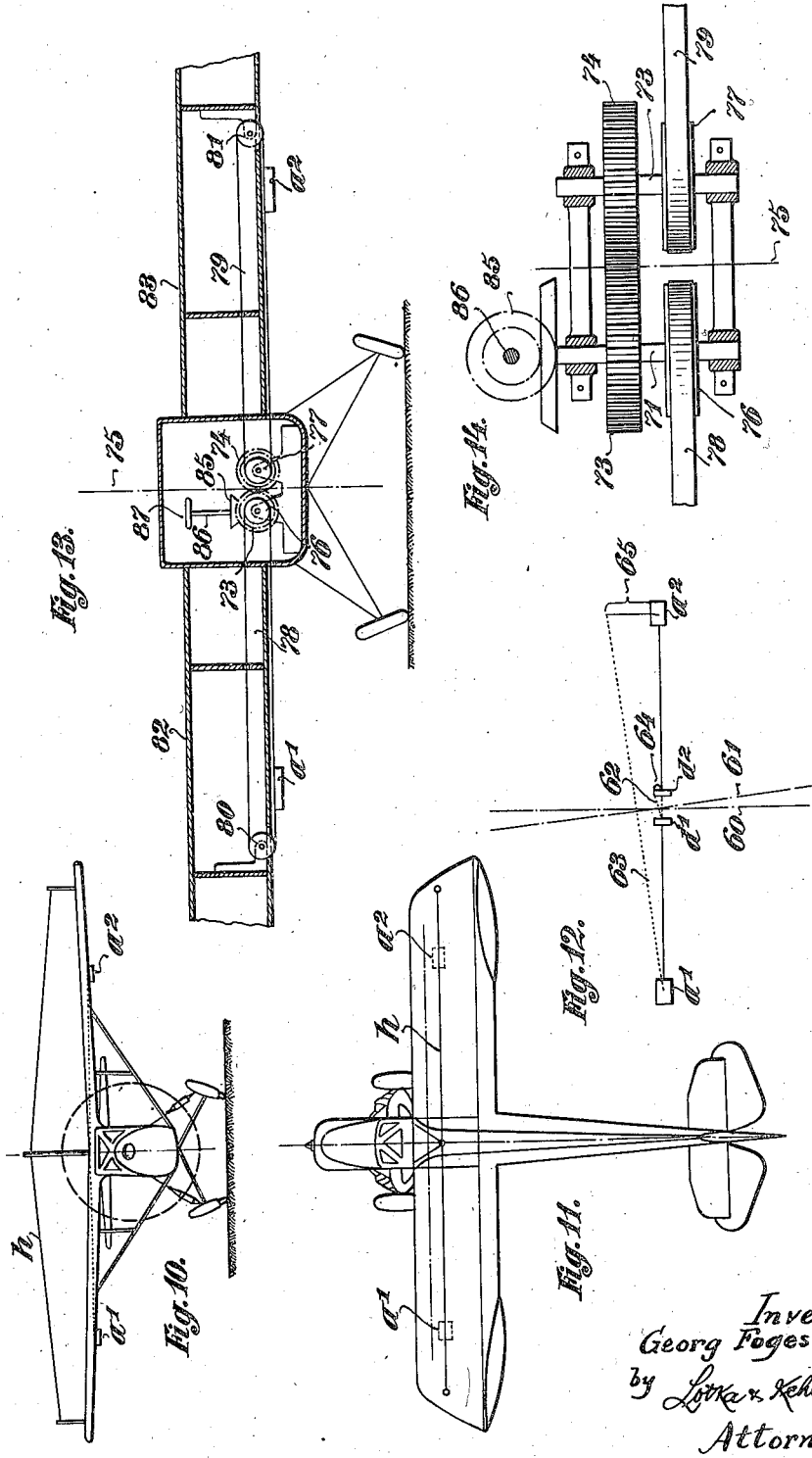

Patented Dec. 15, 1936

2,064,599

UNITED STATES PATENT OFFICE 2,064,599

METHOD OF AND APPARATUS FOR GUIDING AIRCRAFT IN LANDING

Georg Foges, Prague, Czechoslovakia

Application February 9, 1933, Serial No. 655,901
In Germany April 29, 1932

6 Claims. (Cl. 177—352)

This invention relates to an improved method of and apparatus for guiding aircraft in landing.

For determining the position of aircraft use has been made of wireless sounding operations in different form, consisting either in the transmission of wireless signals by the aircraft with determination by a permanent station of the direction from which the aircraft signals proceed, whereupon the ascertained direction is communicated by this station to the aircraft, or in the transmission of signals by a permanent station according to the particular characteristic of that station, the pilot then determining himself the direction from which these signals are received.

These methods of taking bearings certainly indicate to the pilot the direction in which the aerodrome or landing field is to be found, but they do not enable him in foggy weather or on other occasions when visibility is poor to determine the moment when he is over the aerodrome or landing field and should commence to land.

It is accordingly a principal object of this inventioned to provide a method by which the pilot will be properly guided in landing, by receiving indications which will not only lead him toward the landing field, but advise him of the direction in which he is to land, and of the moment at which he reaches a position above the boundary of the landing field.

A further object is the provision of acoustical means for indicating to the pilot the direction of the landing field after, with the assistance of wireless signals, he has arrived in the vicinity thereof.

A still further object of the invention is to permit of successive guiding of an aircraft by means of wireless and also acoustical signals.

A further object of the invention is the provision of an apparatus for emitting wireless signals and a sound-emitting apparatus for the emission of acoustical signals, both apparatus being situated in a line corresponding with the landing direction, and the sound transmitter being located in closer proximity to the landing field than the aerial for transmitting the wireless signals.

A further object of the invention is the provision of three sound-emitting apparatus at the extremities of an equilateral triangle, the centre point of which coincides with the centre point of the landing field, and also the provision of three aerials for the transmission of wireless signals for taking the bearings, each aerial (when viewed in plan) being situated in the extension of the line connecting the centre point of the equilateral triangle with the respective corner of the triangle.

A further object of the invention is the provision of an auxiliary sound-emitting apparatus in the vicinity of each aerial, in such fashion that in each case an aerial, an auxiliary sound transmitter and a main sound transmitter (when viewed in plan) are situated in a straight line, which preferably passes through the centre point on an equilateral triangle, at the corners of which there are located the main sound transmitters.

A further object of the invention is to permit of adjustment of the horn of the sound transmitter at an angle of 45° in an upward direction, pointing towards the appertaining aerial.

A further object of the invention is to transmit at first wireless signals and then acoustical signals in the form of continuous signals of more than 1000 cycles, with continuous change of tone, preferably with indication by wireless signals of the commencement of the acoustical signals.

A further object of the invention is the provision of a sound-emitting apparatus, the sound pitch of which may be varied automatically between maximum and minimum, preferably within an interval of not more than, say, 2 seconds.

A further object of the invention is to provide means on an aircraft for the reception of acoustical signals, consisting of two independent sound receivers combined to form a directional receiving apparatus.

A further object of the invention is the provision of two microphones of the sound-receiving apparatus at least 30 centimetres apart and at the most 3 metres symmetrically to the longitudinal axis of the aircraft, each microphone being connected with the interposition of transforming means to telephones for the observer which are equal on either side.

A further object of the invention is the provision in the receiving device of filters, which allow the passage merely of sound waves above a certain frequency, say, 1000 cycles.

A still further object of the invention is the provision of a receiving apparatus, in which the two symmetrical halves possess identical or at least parallel resonance curves, and are adjusted to the same strengths of sound.

These and other objects and advantages of the invention are revealed by the following description of possible forms of embodiment of the invention as illustrated in the accompanying drawings. It will be understood, however, that I do not wish to restrict myself to the particular embodiments shown, which are disclosed solely by way of example, and that numerous modifications and variations may be made within the meaning of the description and the annexed claims without departing from the spirit of the invention.

In the drawings, in which like elements and parts have been furnished with similar reference characters, Fig. 1 illustrates a landing field or aerodrome in diagrammatical form, with the sound transmitters according to the invention.

Fig. 2 is a perspective view of a part of the landing field with an approaching aircraft, which is fitted with the receiving apparatus according to the invention.

Fig. 7 is a circuit diagram pertaining to the receiving apparatus.

Fig. 10 shows an aircraft with the receiving apparatus, viewed from the front.

Fig. 11 is a view of the same aircraft in plan.

Fig. 12 illustrates the effect of increased spacing of the receiving microphones.

Fig. 13 shows diagrammatically a device for varying the spacing of the microphones, and Fig. 14 is a plan view of parts of this device, partly in section.

Figure 1:
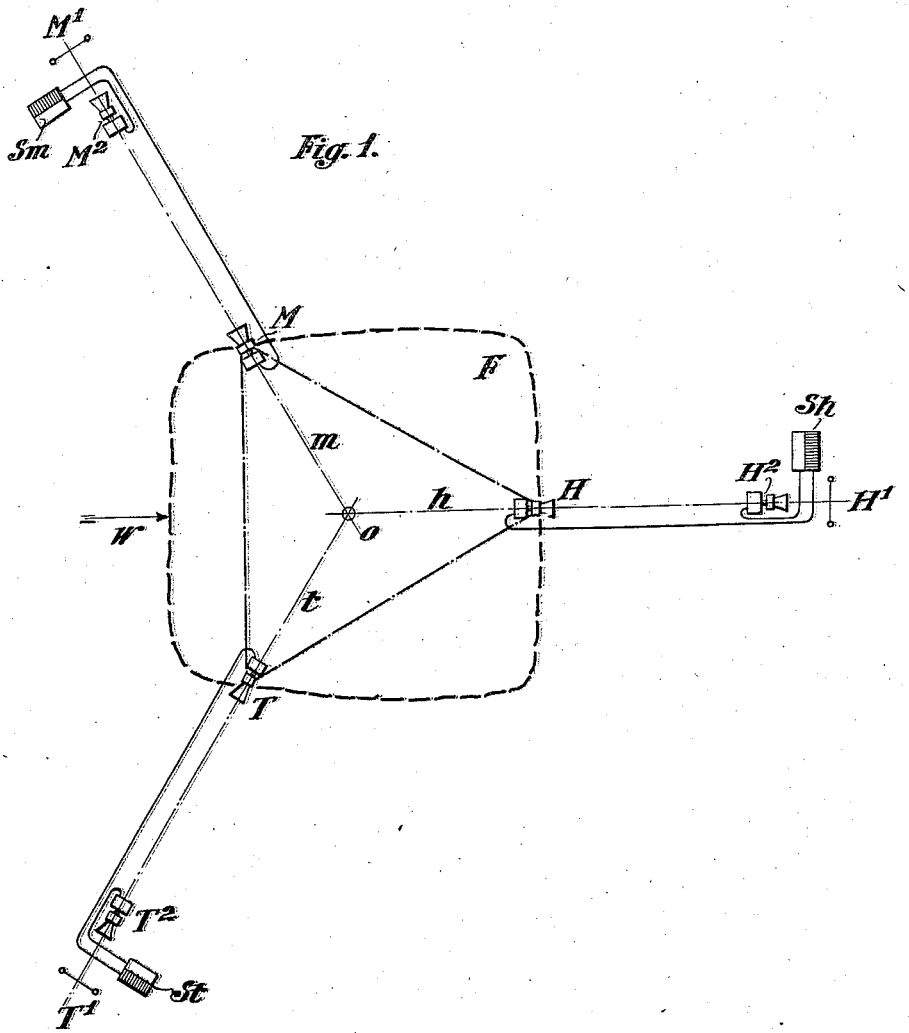

In Fig. 1 O is the centre point of an aerodrome or landing field F, which is the point of convergence of the several landing directions, with the arrangement according to the invention. On the aerodrome there are provided three sound transmitters H, T, M of any suitable kind disposed at the corners or extremities of an equilateral triangle the centre of which is at O. Various well-known types of sound-transmitters are available for this purpose, and the type of transmitter employed does not constitute part of the invention. These transmitters have the object of emitting selectively as desired either short blasts from all three transmitters simultaneously, or long notes or blasts from the individual transmitters, for reception by an appropriate receiving apparatus on an aircraft. In either event, the sounds or blasts emitted should be of such pitch as to be readily perceptible above the noises produced by the aircraft itself, and should, therefore, possess frequencies of preferably more than 1000 cycles.

Now it has been found that in certain engine and propeller sounds there are overtones of more than 1000 cycles, although of small amplitude, and that in this case, therefore, the reception of long blasts or continuous sounds is attended with difficulties, as it is not a simple matter to distinguish between the overtones and the fundamental note of the acoustical signal.

In view of the great variations in the speed of the aircraft, and the alteration thus produced in the apparent pitch of the tone, it is in the case of the emission of a sound of constant frequency or pitch not readily possible to perform tuning in such fashion between sound transmitter and sound receiver that the apparent pitch of tone capable of being detected by the aircraft will coincide exactly with the resonance point of the sound receiving apparatus. If, however, the apparent pitch of tone bears a certain spacial relation to the resonance point, it may occur under certain circumstances that overtones of the disturbing noises possess quite by accident the frequency of the resonance point, and are more or less amplified as compared with the acoustical signals, and this might impair the reception of the sound. It is, therefore, desirable to cause the sound-emitting apparatus to transmit, in place of a tone of constant periodicity, a signal which fluctuates continuously between two predetermined frequencies. The minimum and the maximum frequencies should be so chosen that, bearing in mind the so-called Doppler effect, the resonance point will be traversed under all circumstances upon each fluctuation of tone at the flying speeds actually occurring in practice.

Sound-transmitting apparatus of this nature with tones which fluctuate continuously between two predetermined frequencies are also known per se, for example in connection with sirens. A siren of this character having a suitable means of control will be described later.

The sound transmitters referred to above serve for short-distance signals, and co-operate with a device for signaling at long distances. The long-distance signaling arrangement comprises a wireless transmission station, at which three aerials $H^1$, $M^1$, $T^1$ are arranged in such fashion that each aerial is situated, outside of the aerodrome, in the extension of the lines $h$, $t$, $m$ symmetrically bisecting the angles of the sound-transmitter triangle H, M, T. The aerials are not used for transmission purposes simultaneously, the transmission on each occasion being performed with that particular aerial situated on the line $h$, $t$ or $m$ which is most favorable for landing purposes with regard to the direction of the wind. In certain instances it may be possible and desirable to dispense with the provision of three aerials and three sound transmitters, and to employ only one aerial and one sound transmitter, or two aerials and two sound transmitters, more particularly if merely one predetermined direction or two predetermined directions are available for landing. The method according to the invention may, therefore, also be performed, for example, with merely the one aerial $H^1$ and one sound transmitter H (see Fig. 2), the connecting line of which indicates a favorable direction for landing.

In carrying the method according to the invention into effect there is preferably employed on the aircraft a sound-receiving apparatus, which is at the same time adapted to constitute an apparatus for audibly indicating the direction from which the sound is coming; an apparatus of this nature will be described in detail at a later point. The same comprises in substance two microphones which are arranged below the wings or supporting surfaces symmetrically to the axis of the aircraft.

Each of these microphones is connected through the medium of a sound filter, which allows the passage merely of periodicities above a certain frequency, say, 1000 cycles, and a low frequency amplifier with one of the telephones of a headset, viz., in such fashion that the microphone situated to the left of the pilot is connected with the left hand telephone, and the microphone to the right of the pilot with the right hand telephone. The function of this apparatus is based on the same principle as the well-known two-horn apparatus for detecting the direction of sound in the air, with the exception that in lieu of the sound-receiving horns there are employed microphones and low frequency amplifiers, and merely sound frequencies at or above a certain minimum are allowed to pass. According to the experience gained from the two-horn sound detecting apparatus above referred to, apparatus of this type will furnish very exact indications, and will enable an aircraft to fly with extreme accuracy in the desired direction. In accordance with the German periodical "Die Schalltechnik", No. 3, 1930, page 3, the degree of exactitude which the human ear can attain, without auxiliary means, in detecting the direction of sound amounts to $+3°$, whereas in the case of artificially increased spacing of the ears (as in the case of the well-known sound-direction detecting apparatus) up to 3 metres an exactitude of $+7.5$ minutes may be obtained.

The method according to the invention is performed in the following manner (see Figs. 1 and 2): The aircraft A flies with the assistance of its directing apparatus towards the aerial $H^1$. In view of the assumed direction of the wind $w$ radio waves are emitted merely by the aerial $H^1$. According to experiments conducted by the German Experimental Station for Aerial Navigation it is possible to fly towards a wireless directing transmitter with an accuracy of 200–250 metres (Annual Report of the "Deutsche Versuchsanstalt für Luftfahrt", 1931, Electro-Technical and Radio Section, pages 677 and 678). Immediately the noise of the engine and propeller of the aircraft is heard at the aerodrome, the sound transmitter H is set into operation, and binaurally receivable acoustical signals are emitted. It is desirable to indicate to the pilot by a wireless signal the moment when the sound transmitter commences to operate. Immediately the aircraft has approached to within approximately 250 metres of the wireless transmitter, which may be recognized from the rapid increase in the sound intensity received, the pilot will begin to listen to the signals from the sound transmitter H. For this purpose the pilot switches on the sound-receiving apparatus above referred to. The aircraft is now steered according to the sounds coming from the sound transmitter H. The moment when the aircraft passes over the sound transmitter is readily apparent from the change of tone (this change of tone is known in acoustics as the Doppler effect. The degree of accuracy with which the moment of flying over the point of transmission may be ascertained depends on the altitude at which this takes place and, as shown by test flights, amounts at a height of, say 100 metres to approximately $+30$ metres. Immediately after entering the area above the aerodrome, where flight should be between certain maximum and minimum altitudes, which may be ascertained by any suitable altitude meter, such as a relative altitude meter (echo-sounding device, capacity altitude meter or the like), the pilot starts the machine on a downward glide.

Figure 3:
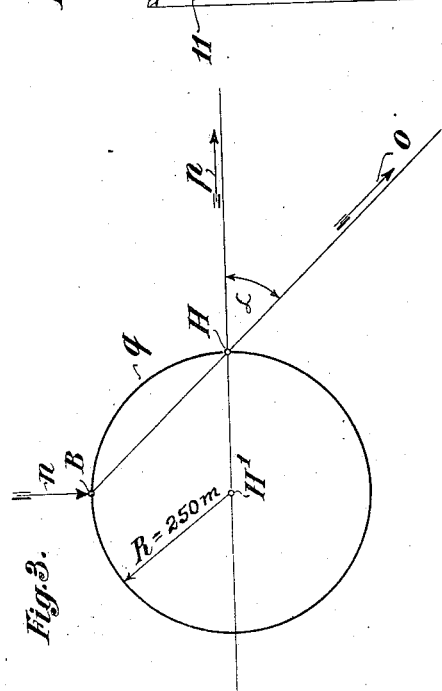
Fig. 3 is a diagrammatical representation of the possibility of error if the spacing between the aerial and the sound-emitting apparatus is inadequate.

Now it would seem obvious to provide each aerial at a slight distance from the appertaining sound transmitter, and to fly towards the source of sound with the assistance of the aural direction detector only over approximately the last 200 metres. This may certainly be permissible in certain instances, viz., in the case of very large aerodromes, but would appear doubtful in the majority of cases, as the aircraft under certain circumstances may commence to land in a direction in which sufficient space is not available to allow the aircraft to slow down after it has touched the ground. Fig. 3 shows the possibilities of error which may arise if the aerial $H^1$ is situated too close to the sound transmitter H. This error is all the greater the larger the larger the angle between the direction of approach of the aircraft towards the wireless transmitter $H^1$ and the actual direction of landing, and the greater the height at which the craft flies over the wireless transmitter. Since the wireless transmitter $H^1$ ceases to operate when the aircraft is still approximately 250 metres away from the same, such craft may cross the circle $q$ about $H^1$, at some point not in line with H and $H^1$ in accordance with the direction from which it approaches. From this point the aircraft steers towards the sound transmitter H. If now, as assumed in the example according to Fig. 3, the sound transmitter H is also situated only 250 metres away from the wireless transmitter $H^1$, and the aircraft approaches from the direction $n$, which forms an angle of 90° with the desired direction of landing $p$, the aircraft when reaching the point B on the circle $q$ would pursue the course O. In this case, however, the angle of error $a$ would amount to 45°.

Even if it is assumed, however, that the pilot when flying towards the wireless transmitter corrects his line of flight to agree approximately with the desired direction of landing with the assistance of the compass, which is quite possible, undesirable errors are nevertheless still liable to occur if the wireless and the acoustical transmitters are situated too close together.

Figure 4:
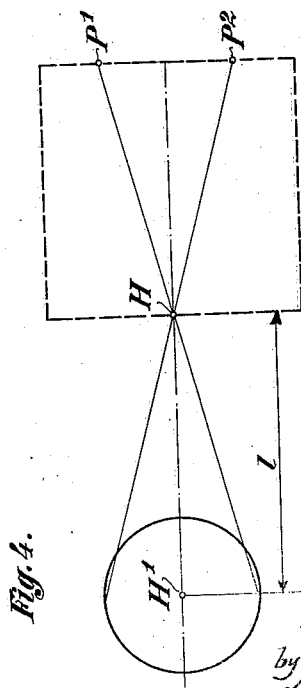
Fig. 4 is a diagram illustrating the conditions determining the minimum distance between aerial and sound-emitting apparatus.

For these reasons—and this also constitutes part of the invention—each aerial is erected at a certain minimum distance $l$ from the appertaining sound transmitter (see Fig. 4). The minimum distance, generally speaking, is different in the case of each particular aerodrome in respect of each of the three aerials, and is determined quite definitely with consideration to the above assumption, from the requirement for a certain, adequate minimum spacing of the points of intersection $P^1$, $P^2$ and H of the horizontal projection of the line of flight with the boundary of the aerodrome on the one hand and the permissible maximum extent of error on the other hand, which latter is represented by the circle about $H^1$.

Figure 5:
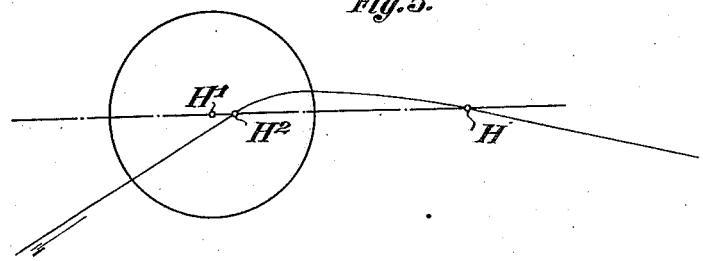
Fig. 5 illustrates diagrammatically the arrangement of an auxiliary sound transmitter.

The practical execution of the method in the manner described above is also accompanied by the drawback consisting in the fact that the pilot has no reliable indication that he has in point of fact flown beyond the wireless station by a distance of not more than 250 metres—that is to say, in this form of the method there is no possibility of taking a check and of correcting in good time any error which may have occurred. This checking and correcting operation may also be performed acoustically by means of the arrangement described in the following:

According to Figs. 1, 2 and 5, there is associated with each aerial $H^1$, $T^1$ and $M^1$ a second sound transmitter $H^2$, $T^2$ and $M^2$, which is provided in the vicinity of its appertaining aerial. In the following there will be described merely the arrangement in conjunction with the transmission group H, H¹, H², as the transmission groups M, M¹, M² and T, T¹, T², if the same are provided at all, are of substantially the same character. In the drawings additional equivalent parts have been provided with the same reference charcters with an additional letter referring to the particular transmission group concerned. Thus, for example, the control point for the transmission group H has been designated S$h$, that for the group M by the reference character S$m$, and that for the group T by the reference character S$t$.

The second sound transmitter H², which acts as an auxiliary sound transmitter, is preferably constructed to emit sounds differing in frequency or pitch from those emitted by H. The sound transmitters H and H² are actuated from a point S$h$, which is preferably located in the immediate neighborhood of H². When the aircraft approaches, H² is first operated alone. As the aircraft passes over H² this transmitter is shut off and the transmitter H switched on. The moment when the craft flies over H² may be ascertained with sufficient accuracy by the persons on the ground at that point operating the sound transmitter on the basis of the Doppler effect which is clearly perceptible to a person listening to the engine and propeller noise. The landing operation now proceeds as follows: When change over is made from flying according to wireless to flying according to acoustical signals, the pilot first steers towards the sound transmitter H². In this manner it is accomplished that any inadmissibly large errors in flying according to wireless may be compensated before reaching the points H¹, H². The change of tone observed by the pilot when he flies over H² also informs him that the edge of the aerodrome is located a certain specific distance ahead. After H¹ and H² have been passed, there is switched on the sound transmitter H, as already explained previously. The steering towards H and the landing operation itself then take place in the manner already described.

The preferred apparatus for performing the invention, which will be described more concisely in the following, are the sound transmitter and the sound-receiving apparatus with the binaural-direction detector. Where in this specification the expressions "binaural" or "spatial hearing" are used, I wish to refer to that quality of the human sense of hearing, by which acoustical waves are not only perceived with both ears, but also defined as to the direction from which the acoustical waves arrive. This presupposes that both ears or perception organs are spaced from one another and adapted to receive separately and individually the acoustical waves starting from one point, and that these waves are of a frequency at which such "binaural hearing" is possible.

The sound transmitters may be of the compressed-air or electrical type of the known construction. The frequencies employed should exceed 1000 cycles in order to rise substantially above the natural frequencies occurring in the noise of the engine and the propeller. Sound transmitters with high frequencies of this nature, or short wave length, have the property of transmitting directional sound waves. It is accordingly desirable in the method according to the invention to place the axis of the sound horn in the line connecting the sound transmitter and the aerial, with the mouth of the horn directed towards the aerial, and to tilt the axis of the sound horn at an angle of 45° to the horizontal.

The sound transmitter is preferably furnished with a means for performing the continuous change of tone automatically.

These means may vary according to the nature of the sound transmitter employed. For example, when using a siren the change of tone may be obtained in very simple fashion by automatic regulation of the circumferential velocity of the operating motor, or in the case of compressed air transmitters of the diaphragm type by a regular and possibly telescopic extending and shortening of the sound horn. The time interval between maximum and minimum of the pitch should preferably amount to not more than 1–2 seconds, so that the crossing of the edge of the aerodrome by the aircraft may be ascertained by the Doppler effect.

Figure 6:
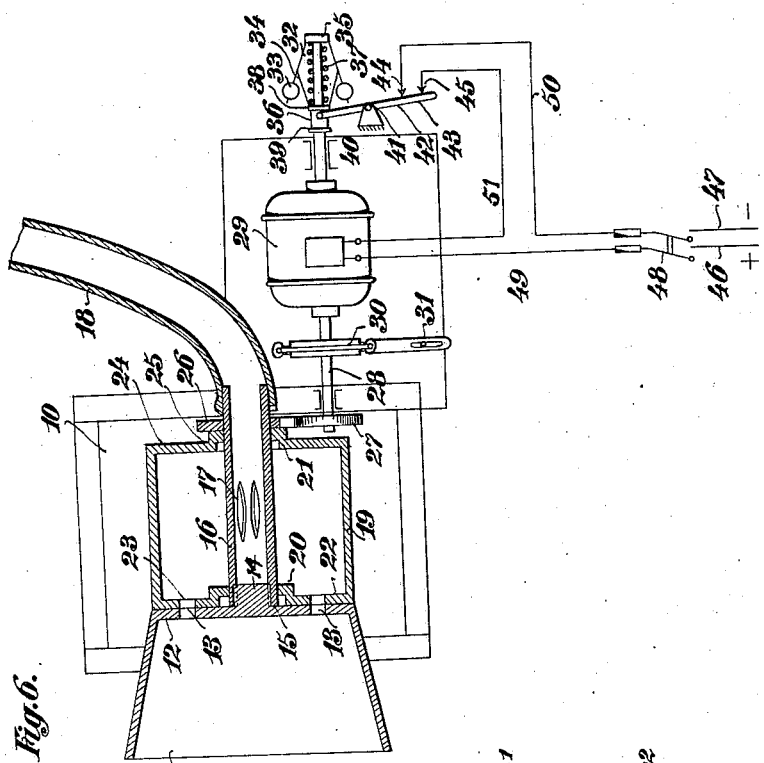
Fig. 6 is a plan view of a sound transmitter, partly in section.

In Fig. 6 there is shown a suitable acoustical transmitter in the form of a compressed air siren with electrical control. On a base plate 10 there is mounted to turn a sound horn 11, the bottom 12 of which is furnished with a plurality of holes 13. The bottom 12 has an extension 14 in the direction of the axis, on which extension there is mounted in suitable fashion, for example by means of a thread 15, a hollow shaft 16. With the hollow shaft 16, which possesses lateral openings 17, there is connected a piping 18 communicating in suitable fashion with a compressed air source (not shown). As disclosed by Fig. 2, the axis of the funnel or horn is so directed that the same points away from the landing ground at an angle of 45° upwards, and is situated in the same vertical plane with the line $h$ indicating the proper direction of landing. The hollow shaft 16 is surrounded by a hollow cylinder 19, which is rotatably mounted thereon at 20 and 21. The bottom 22 of the cylinder adjacent to the bottom 12 of the horn 11 possesses apertures 23 opposite the apertures 13.

The second cylinder bottom 24 has an extension 25, which is furnished with a toothed rim 26. These teeth engage with a pinion 27, which is mounted firmly on the armature shaft 28 of an electro-motor 29. A brake 30 is provided on the armature shaft, which brake may be regulated at 31.

There is also mounted on the armature shaft 28 a centrifugal governor 32, the fly-weights 33 of which are pivotally connected by the lever mechanism 34 on the one hand with the armature shaft, or with a fixed collar 35 thereon, and on the other hand with a sleeve 36. The sleeve 36 is shiftable on the armature shaft 28 in an axial direction. A spring 37 fitted between the collar 35 and the sleeve tends to move the sleeve towards the left and to move the fly-weights towards the shaft 28. The sleeve 36 is bounded by collars 38 and 39. Between the two collars 38 and 39 there is situated the one end 40 of a two-armed lever 42, which is mounted to rock at 41, and the other end 43 of which is capable of bridging two contacts 44 and 45.

Current leads 46, 47 pass from a current source +— to a two-pole switch 48, the one pole of which is connected by a line 49 with the motor, and the other pole of which is connected by a line 50 with the contact 44. An additional line 51 leads from the contact 45 to the motor 29.

The device operates in the following manner: To cause the siren to emit sound the switch 48 is thrown in, and at the same time compressed air is supplied through the piping 18. The compressed air passes through the shaft 16 and apertures 17 into the interior of the cylinder 19, and from there through the apertures 23 and 13 to the sound horn 11.

Since the two-armed contact lever 42 is in the position shown in Fig. 6, current passes to the motor 29. The motor commences to run, and rotates the cylinder 19 through the medium of the gear wheels 27 and 26. The passage of the compressed air through the openings is accordingly permitted and obstructed alternately during the movement of the openings 23. The more rapidly this change takes place, the higher, as well known, is the tone produced by the siren.

The motor 29 gradually increases in velocity, so that the fly-weights 33 swing out against the action of the spring 37 and displace the sleeve 36 towards the right. At the same time the collar 38 is moved away from the end 40 of the contact lever 42, whilst the collar 39 approaches the same. This movement continues until the collar 39 reaches the end 40 and moves the same clockwise about the fulcrum 41. In this manner, however, the flow of current between the contacts 44 and 45 is interrupted, the velocity of the motor drops more or less rapidly according to the adjustment of the brake, the spring 37 is able to overcome the diminishing centrifugal force of the weights 33 and displace the sleeve 36 towards the left until the collar 38 thrusts against the end 40 of the contact lever 42 and moves over the same anti-clockwise to close the circuit at 45, 43, 44 and again supply current to the motor 29. In this fashion there is accordingly produced a periodically increasing and decreasing tone of the siren.

The aural-receiving device and the sound-direction detector are illustrated diagrammatically in Fig. 7.

Figure 8:
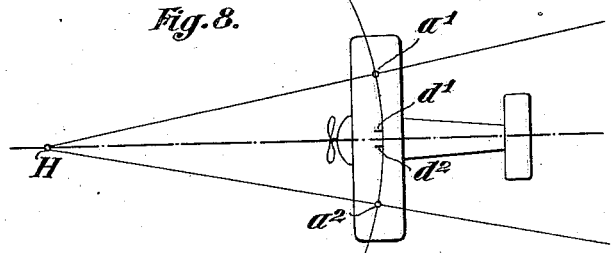
Fig. 8 illustrates the reception of waves of the same phase.
Figure 9:
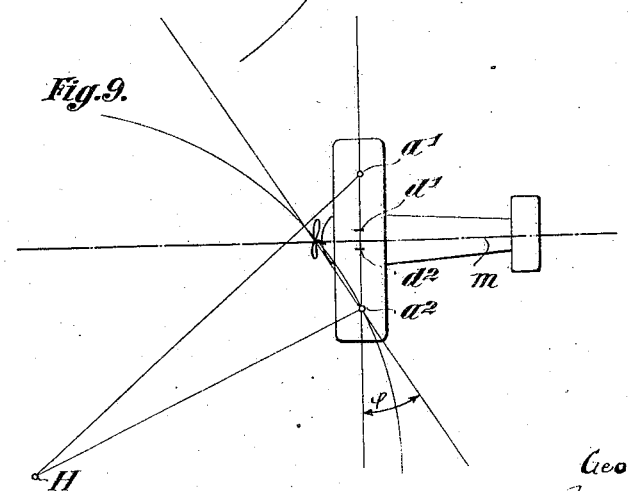
Fig. 9 illustrates the reception of waves of different phase.

These consist of the two receiving microphones $a^1$ and $a^2$ of the known kind, which are mounted, for example, 3 metres apart symmetrically to the axis of the aircraft below the wings, and of the sound filters $b^1$ and $b^2$, which each are formed by a system of choke coils $e$ and condensers $f$, the two low-frequency amplifiers $c^1$ and $c^2$, and the headphones $d^1$ and $d^2$ of the known construction. $a^1$, $b^1$, $c^1$, $d^1$ and $a^2$, $b^2$, $c^2$, $d^2$ each form a sound-receiving system which is independent of the other. The two sound-receiving systems possess, within the frequency range concerned in actual practice, identical or at least parallel resonance curves, and allow the passage only of sound waves above a certain frequency, say, 1000 cycles. This may be accomplished in the known manner by suitable dimensioning and arranging the choke coils $e$ and the condensers $f$, and also if necessary with the assistance of other means. Oncoming sound waves above this frequency are conducted from the microphone $a^1$ to the headphone $d^1$, and from the microphone $a^2$ to the headphone $d^2$. If the axis of the aircraft points directly towards the source of sound H, the sound waves reach the two microphones, or the headphones, or the ears respectively, with equal phase (see Fig. 8). If, however, the axis of the aircraft forms an angle with the direction of the sound (Fig. 9), there is a shifting in the phase of the oncoming sound waves in respect of the two ears, the extent of this displacement being dependent on the size of the angle $\varphi$ and the spacing of the microphones.

In addition to the sound-receiving apparatus there is also provided the radio receiving apparatus $g$ with aerial $h$ shown in Fig. 7.

By throwing the switch $i$ to one or the other of its positions, the headphones $d^1$, $d^2$ may be connected selectively with the radio apparatus $g$ or with the sound-receiving apparatus. In the position of the switch indicated in full lines the telephones cooperate with the radio apparatus $g$, and in the position indicated in dotted lines with the sound-receiving apparatus.

Figs. 10 and 11 show at what points of the aircraft the microphones $a^1$ and $a^2$ and the aerial $h$ may be mounted.

When employing the sound-receiving apparatus the steering of the aircraft toward the source of sound may be performed purely instinctively. The procedure is the same as when determining the direction of the sound with the naked ear, in which case every person turns instinctively with the face towards the source of the sound until shifting of the phase is no longer apparent. In the present case the spacing of the ears is, as it were, increased artificially with the assistance of the symmetrically disposed microphones, the degree of exactitude thus being increased.

In Fig. 12 there is depicted the effect of the increased spacing of the sound-receiving organs or microphones. 60 is the longitudinal axis symmetrical to the ears or headphones $d^1$ and $d^2$ and to the microphones $a^1$ and $a^2$. 61 indicates the direction of the sound, and 62 and 63 are perpendiculars to the sound direction 61 taken through the headphone $d^1$ and the microphone $a^1$ respectively. The lines 64, 65 perpendicular to the line connecting $a^1$ and $a^2$ then provide a measure for the increase in the time difference for the same state of oscillation, or in respect of the shifting of the phase, with natural spacing of the ears $d^1$—$d^2$ and artificial spacing of the sound-receiving organs $a^1$—$a^2$.

Further, it is important that the low-frequency amplifiers should possess fine adjustment means for regulating the intensity of the sound, as the intensity of a sound wave in the lines of symmetry between the microphones requires to be audible to both ears in exactly the same measure. Adjustment to the correct condition is preferably performed as follows: In the axis of the aircraft, or in the extension thereof, there is provided a source of sound of correspondingly high frequency mounted at an equal distance from the microphones $a^1$ and $a^2$. By means of this device there are emitted continuous acoustical signals, and the two low-frequency amplifiers $c^1$ and $c^2$ are adjusted to the desired receiving sound intensity and subjected to correcting action until the intensity of sound is the same in respect of both ears. Preferably, there may be employed a small sound-emitting means, for example on lines similar to an automobile horn, mounted firmly on the aircraft, the same enabling the sound intensity received to be corrected at any time as desired. In this connection it is important that the sound-emitter employed for the preliminary adjustment should possess the same frequency as the one used for signaling or indicating purposes. In this case this frequency is situated mid-way between the apparent frequencies which are concerned in the signaling or guiding operation, resulting from the action of the Doppler effect.

It has been found desirable in the arrangement of the sound-receiving microphones of the sound-direction detecting apparatus to adopt particular measures in order to maintain the phase shift or increase in the difference between the times at which the same state of oscillation occurs in respect of both ears, arising from the artificial increase in the spacing of the ears, within certain limits corresponding with the required range of measurement.

Whereas upon determining the direction of sound as in the case of the known sound-detecting apparatus the limit to which the ear spacing may be increased artificially depends solely on the difference in time at which spatial or binaural hearing by means of both ears is still possible, and which in accordance with tests conducted otherwise is approximately .022 second, or expressed in the distance traveled by sound during that time, approximately 1.5 metres, the upper admissible limit in the case of notes is not a constant value, but a function of the wave length or the frequency. In the case of notes to be received, the maximum admissible phase shift or time difference in respect of the same state of oscillation should not be greater than one-half wave length, as otherwise a positive determination of the direction is no longer possible. If, for example, in the case of notes or sounds, the waves received by the one ear lag behind to the extent of more than one-half wave length, the subjective impression is the same as if the waves received by the other ear arrived less than one-half wave length earlier, whereas actually they arrive later. Although from a practical standpoint, due to other circumstances, viz, the difference in the intensity of the sound and the timbre, confusion between right and left only takes place upon a displacement in the phase considerably greater than one-half wave length, it is nevertheless desirable for practical reasons when employing notes as directing sound signals to pay consideration to the facts set forth in the above.

The extent of the maximum admissible phase shift is not only a function of the wave length or frequency, but also of the maximum angle between the longitudinal axis of the aircraft and the apparent direction of the sound assumed to be the range of measurement, and of the spacing of the two receiving microphones. The lower the frequency or the longer the wave length, the greater may be the difference in time in respect of the same state of oscillation. In ordinary spatial listening with the naked ear the degree of exactitude, i. e., the angle of deflection in relation to the centre line, which may be perceived amounts to approximately $+1\frac{1}{2}-3°$. This degree of accuracy increases roughly in proportion to the increase in the spacing of the ears. Accordingly, there are two contradictory requirements, which require to be satisfied. On the one hand positive determination of the direction necessitates that, as mentioned, the artificial spacing of the ears be not increased beyond one-half of the wave length. On the other hand the desire for increased accuracy calls for the widest possible spacing of the microphones.

This shows that it is not always possible, as in the case of the known sound-direction detectors, to employ with advantage relatively large spacing of the sound-receiving organs of, say, 3 metres, but that it may be preferable to arrange the microphones approximately 30-50 centimetres apart.

It is also advisable when employing the device, possibly for the purpose of distinguishing between different transmitters, to cause the several transmitters to emit sound waves of different length, in which case it is even possible if necessary to operate with wave lengths considerably lower than the notes or sounds which have been considered in the above, for example even with low noises. In order to be able to adapt the directional sound-receiver to the individual wave lengths of different transmitters the spacing of the microphones is, in accordance with the invention, made adjustable, preferably so as to cover the complete wave range concerned, say, between 10 centimeters on the one hand and 3 metres on the other hand. In this connection provision may be made for adjustment of the spacing by the ground crew, for instance in cases in which the proper adjustment of the spacing with respect to a predetermined wave length is to be made before starting a flight. Instead of this, the pilot may be furnished with means by which he is able from the cockpit to vary the spacing of the microphones while the machine is in flight, if desired with the simultaneous use of scales or graduations which indicate to him the relative position or spacing which the microphones, invisible to the pilot, have assumed at each particular setting, or the particular wave lengths to which the microphones are adjusted. When the distance between the microphones varies from approximately 30 to 50 centimeters as mentioned above, the distance of each of them from the longitudinal axis of the aircraft will vary from approximately 15 to 25 centimeters.

A form of embodiment for adjusting the microphones $a^1$ and $a^2$ is illustrated diagrammatically in Figs. 13 and 14. In the fuselage of the aircraft there is provided within reach of the pilot an operating mechanism. This comprises in substance a single-part or multi-part standard 70, in which two parallel shafts 71 and 72 are mounted rotatably and in symmetrical arrangement to the longitudinal centre plane 75 of the aircraft. Firmly connected with each shaft is a gear wheel 73, or 74. The two gear wheels are of equal size, and engage with each other.

Each of the shafts 71 and 72 carries in addition, firmly connected therewith, a belt pulley 76, or 77, respectively, with an endless belt 78, or 79, respectively, these belts also running over pulleys 80 or 81 respectively, in or on the wings 82 and 83 respectively, of the aircraft. On the belts there are suspended at an equal distance from the longitudinal centre plane 75 of the aircraft the two microphones $a^1$ and $a^2$, so that the same project beyond the wings 82, 83.

One of the shafts (the shaft 71 in the drawings) also carries a bevel wheel 84, which meshes with a second bevel wheel 85. The shaft 86 of this bevel wheel 85 is furnished with a hand-wheel 87 or the like.

In the position shown in the drawings the microphones are situated approximately at their widest distance apart. It is obvious that the two microphones $a^1$ and $a^2$, if the same were originally located at an equal distance from the plane 75, approach towards or move away from each other upon rotation of the wheel 87 dependent on its direction of rotation, but at the same time always remain equidistant from the plane 75, as both the wheels 73 and 74 as well as the pulleys 76 and 77 are of equal size. In place of the belt drive it is naturally also possible to employ any other equivalent driving means. These equivalents may be, for example, rope or cord drives, chain drives, or left and right hand threaded spindles with nuts. A scale with pointer (not shown) may serve in conjunction with the operating mechanism to indicate to the pilot the spacing of the microphones at any particular time.

Although in substance merely a few embodiments of the invention have been illustrated in the drawings, numerous modifications are quite possible which will be obvious to those skilled in the art.

For this reason merely the claims appended hereto are considered as decisive in determining the scope of the invention.

What I claim as new and desire to secure by Letters Patent is:

1. A method of guiding aircraft in landing which consists in emitting radio waves from a point in line with the intended landing direction, and also emitting sound waves directed in line with but against the intended landing direction, the point of emission of said sound waves being located near the boundary of the landing field where the craft is intended to enter the confines of said field, and the point of emission of the radio waves being located outside said field, on the side from which the craft is intended to approach the field, and within the range of perceptibility of said sound waves, receiving on the aircraft first said radio waves and, then, by binaural hearing, said sound waves, whereby the pilot of the aircraft will be guided by means of the radio waves to a point from where he automatically takes up the intended landing direction when steering according to binaural hearing toward the emitter of said sound waves and will be advised as to when to land by his perception of the Doppler effect.

2. A method of guiding aircraft in landing which consists in emitting sound waves from a first point in the vicinity of an aerial emitting radio waves, said point being located in line with the intended landing direction outside the landing field on the side from which the craft is intended to approach the field, emitting sound waves perceptible in the neighborhood of said first point and said aerial from a second point distant from the first point but likewise in line with said direction, said second point being located near the landing field where the craft is intended to enter the confines of said field, said sound waves emitted from said first and said second point being directed in line with, but against said intended landing direction, and receiving on said aircraft first said radio waves, and, thereafter, by binaural hearing the sound waves from said first point and, then, from said second point.

3. In combination with a landing field an apparatus for guiding aircraft in landing comprising a sound emitter located near the boundary of the landing field and arranged to direct sound waves of at least 1000 cycles outwardly with respect to the landing field in a definite path, and a radio wave emitter located at a distance from said field in line with said path within the range of said sound waves.

4. In combination with a landing field an apparatus for guiding aircraft in landing comprising a main sound emitter located near the boundary of the landing field and arranged to direct sound waves of at least 1000 cycles outwardly with respect to the landing field in a definite path, a radio wave emitter located at a distance from said field in line with said path within the range of said sound waves, and an auxiliary sound emitter located between said main sound emitter and said radio wave emitter, in the neighborhood of such radio wave emitter, said auxiliary sound emitter being arranged to direct sound waves in the same direction as the main sound emitter.

5. An apparatus according to claim 3, in which the distance between the sound wave emitter and the radio wave emitter is greater than 250 meters.

6. An apparatus according to claim 4, in which the distance between the main sound emitter and the radio wave emitter is greater than 250 meters and the distance between the radio wave emitter and the auxiliary sound wave emitter is smaller than 250 meters.

GEORG FOGES.